Patented May 12, 1953

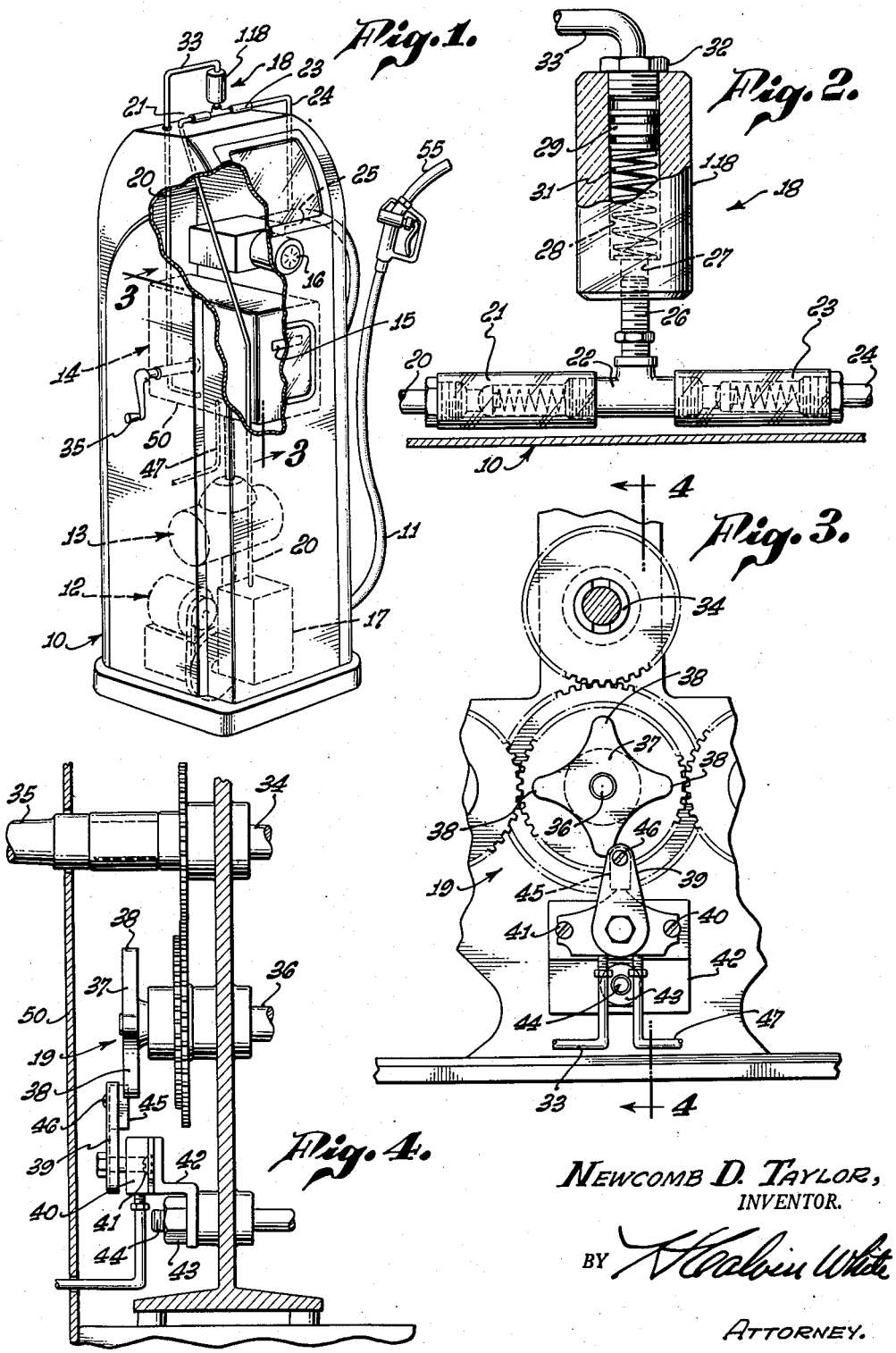

2,638,247

UNITED STATES PATENT OFFICE 2,638,247

INJECTION OF ADDITIVES INTO FLUIDS BEING DISPENSED

Newcomb D. Taylor, Long Beach, Calif., assignor to The Hancock Oil Company of California, Signal Hill, Calif., a corporation of Delaware Application July 29, 1950, Serial No. 176,555

4 Claims. (Cl. 222—23)

This invention relates to the dispensing of fluids, and concerns particularly apparatus for introducing additive substances into a fluid being dispensed. Though the invention is in certain of its broad aspects applicable to the dispensing of various fluids, the invention is especially intended and in certain more specific aspects especially adapted for introducing additives into gasoline and other liquid fuels, and will be discussed primarily as applied to that use.

The performance of an internal combustion engine can be improved considerably by the addition to its fuel of certain known additives, as for instance a suitable carbon removing solvent or an upper cylindrical chamber lubricant. Consequently, many fuel dealers have now adopted the practice of mixing such an additive into their premium grade of fuel. However, since this additive is generally mixed into the fuel within an underground reservoir, there is no assurance that the mixture will be uniform so that each gallon of fuel will contain its correct amount of additive, nor does a customer have any indication as to whether sufficient additive has been provided to assure any appreciable effect on the engine.

A major object of the present invention is to obviate the above difficulty by providing apparatus for injecting an additive into a liquid fuel or other fluid as it is being dispensed and in a manner positively assuring delivery of the additive in proper amounts. More particularly, I contemplate introducing an additive into a fuel being dispensed in direct accordance with the rate of fuel delivery, preferably by intermittently injecting metered quantities of additive into the fuel.

A further object of the invention is to provide apparatus for injecting an additive into fuel and including means visible at the outside of the fuel pump housing for indicating to a customer the introduction of the additive. For this purpose, the additive may be measured in full view of a customer in order that he may see the exact amount of solvent or the like added to the fuel. Desirably, the measured additive is delivered directly into the pump delivery hose at the outside of the pump housing.

In the preferred form of the invention, I employ a metering pump adapted to receive a predetermined charge of liquid additive and operable at given delivery intervals, as for instance upon the delivery of each ¼ gallon of fuel, to inject that predetermined charge of additive into the fuel being dispensed. Particularly contemplated is the provision of an additive pump having a wall formed of transparent material, typically a suitable plastic, through which a customer may view the measurement and displacement of additive within the pump. Preferably, the pump comprises a transparent cylinder, containing a piston which is intermittently operable by a suitable operating means, as by the admission of compressed air against one of its sides, to effect the injection of the additive from the cylinder and into the fuel delivery line, all within sight of the customer.

I prefer to control the delivery of additive into the fuel in accordance with the operation of the usual fuel meter to thus assure injection of the additive in a predetermined proportion irrespective of the rate of fuel delivery. More specifically, the additive injecting apparatus may be controlled by connection to the meter driven sale computing mechanism in the fuel pump housing. For example, I may control the delivery of additive into the fuel in accordance with the rotation of one of the shafts of the computer, preferably by injecting a metered quantity of additive into the fuel one or more times during each of the shaft revolutions. For this purpose, I may provide a three way air valve operable by a cam carried by the computer shaft to intermittently admit piston actuating air to the additive metering cylinder.

The above and other features and objects of the present invention will be better understood from the following detailed description of the typical embodiment illustrated in the accompanying drawing in which:

Fig. 1 is a perspective view partially broken away of a filling station fuel pump unit embodying the invention;

Fig. 2 is an enlarged fragmentary front view of the additive metering cylinder and associated check valves, the cylinder being partially broken away;

Fig. 3 is an enlarged fragmentary side view of the computer mechanism taken on line 3—3 of Fig. 1 and showing especially the manner in which the compressed air control cam and three way valve are mounted to and driven by the computer; and Fig. 4 is a transverse section taken on line 4—4 of Fig. 3.

In the drawings, I have illustrated the invention as applied to a conventional gasoline dispensing pump unit comprising a vertically extending housing 10 to the outside of which is mounted a discharge hose 11 and within which is contained a pump 12 for discharging gasoline through the hose. The outer end of hose 11 carries the usual discharge nozzle 55 containing a valve by which the operator controls the discharge of fuel. Above the pump, the housing contains a meter 13 responsive to the rate of fuel delivery, a computing mechanism 14 operable by the meter to register at 15 the amount and the price of fuel delivered at each sale, and the usual flow indicating device 16. The additive introducing apparatus, with which the invention is primarily concerned, includes a container 17 within housing 10 for containing a supply of additive, a metering and injecting pump 18 mounted at the top of the housing, and a computer actuated control assembly generally indicated at 19.

Container 17 may be of any suitable size and may be positioned at any convenient location within the housing, as for instance in the lower portion of the housing as shown. A suction line 20 extends upwardly within housing 10 from container 17 and extends through the upper wall of the housing for connection to the additive metering pump 18. This pump includes a vertically extending transparent cylinder 118 formed of plastic or the like and containing a vertically movable additive displacing piston 29. The lower end of the cylinder connects with a T-fitting 22 which connects at its opposite sides with a pair of suction and discharge check valves 21 and 23. Each of these check valves preferably has a transparent tubular body, as shown, permitting viewing of the displacement of fluid therein. Check valve 21 is connected to the additive suction line 20 and permits additive flow only in a direction toward the cylinder. Check valve 23 permits flow only away from the cylinder and connects with line 24 leading into a fitting 25 to which the delivery hose 11 is mounted.

Coil spring 31 within cylinder 118 bears against the underside of piston 29 to normally urge it upwardly into engagement with a tubular fitting 32 threaded into the upper end of the cylinder. Actuation of piston 29 downwardly against the tendency of spring 31 is effected by the admission of compressed air into the upper end of the cylinder through fitting 32 from a line 33 extending upwardly from within the housing. Air is admitted into the lower end of line 33 from an air supply line 47 under the control of mechanism 19 which is mounted to and governed by the sale computer 14. The computer is of conventional design and has been illustrated in detail only insofar as considered necessary to clearly bring out the mounting of the air control mechanism 19. The computer is typically illustrated as contained within a box-like housing 50 and includes the usual resetting shaft 34 carrying a resetting handle 35 projecting from one side of the pump housing. The control mechanism 19 is driven by a second shaft 36 which is preferably adapted to rotate through a single complete revolution during the delivery of each gallon of fuel. Shaft 36 carries at its outer end a cam 37 having four equally spaced lobes 38 operable to engage and actuate an upwardly projecting arm 39 of a three way air control valve 40. Valve 40 is mounted in any suitable manner to the side of the computing mechanism, as by attachment through screws 41 to an angle bracket 42 which is retained by a nut 43 on a threaded bolt or lug 44. Control arm 39 of the three way valve preferably has an inner lug 45 mounted to the arm by a screw 46 and adapted to be engaged by the cam to actuate the valve.

In use, tank 17 is filled with a suitable fuel additive, preferably a fluid adapted to serve as both a carbon solvent and an upper cylinder chamber lubricant. The fuel is then dispensed into an automobile fuel tank or other container in the usual manner through delivery hose 11. As the computer mechanism records the delivery of fuel, it automatically controls the intermittent injection of metered quantities of the liquid additive into the hose 11. Specifically, as one of the lobes 38 of cam 37 engages and actuates arm 39 of valve 40, the valve is opened to admit compressed air from supply line 47 into the upper end of cylinder 18 through line 33. This air displaces piston 29 downwardly within the cylinder against the tendency of spring 31 to discharge the additive contained in the cylinder through check valve 23 and line 24 into the delivery hose for discharge with the fuel. Check valve 21 prevents return of the additive through line 20 and into the tank 17 during this discharging motion of the piston.

When the active lobe 38 of cam 37 reaches a predetermined release position, arm 39 of valve 40 is released for return under the influence of a contained spring (not shown) to its normal Fig. 3 position. In this normal condition of the valve, the air supply to line 33 is shut off and that line is placed in communication with the atmosphere to release the pressure above piston 29 and permit upward movement of the piston under the influence of spring 31. This upward piston movement draws a second charge of additive into the cylinder from tank 17 through line 20 and check valve 21. At this time check valve 23 closes to prevent the back flow of any additive or fuel into the cylinder through line 24. As the next successive lobe 38 of the cam engages and displaces arm 39 of the three way valve, the piston is again actuated downwardly to inject a second measured charge of additive into the fuel delivery hose. In this manner, a charge of fluid is introduced into the fuel for each ¼ gallon of fuel delivered. It will of course be understood that the number of lobes on cam 37 may be varied to control the frequency of additive injections. Since the cylinder 18 is transparent and positioned at the outside of housing 10, the customer is able to see the amount of additive injected into the fuel which he purchases.

I claim:

1. A liquid fuel dispensing unit comprising a housing, a delivery hose having a discharge end at the outside of said housing, a pump at the inside of the housing communicable with said hose and operable to pump a stream of fuel therethrough for delivery from said discharge end thereof, a meter within the housing responsive to the rate of fuel delivery by the pump through the hose, computer mechanism in the housing operable by the meter to register the amount of fuel delivered, a container for holding a supply of additive to be added to the fuel, means operable to inject metered amounts of additive from said container into the fuel stream, and means operable by said computer mechanism to actuate said injecting means at rates varying in accordance with the rate of fuel delivery.

2. A liquid fuel dispensing unit comprising a housing, a delivery hose having a discharge end at the outside of said housing, a pump at the inside of the housing communicable with said hose and operable to pump a stream of fuel therethrough for delivery from said discharge end thereof, a meter within the housing responsive to the rate of fuel delivery by the pump through the hose, a computer mechanism in the housing operable by the meter to register the amount of fuel delivered and including a shaft rotatable in accordance with the rate of fuel delivery through the hose, a container for holding a supply of additive to be added to the fuel, fluid pressure actuated means operable to inject additive from said container into the fuel stream, valve means operable to control the admission of actuating pressure fluid to said injecting means, and a cam carried by said shaft of the computer mechanism for actuating said valve means to admit fluid to said injecting means in accordance with the rate of fuel delivery.

3. A liquid fuel dispensing unit comprising a housing, a delivery hose mounted to said housing and having a discharge end at the outside of the housing, a pump within the housing operable to pump fuel into and through said hose for delivery from said discharge end thereof, a meter within the housing responsive to the rate of fuel delivery by the pump through the hose, computer mechanism in the housing, operable by the meter to register the amount of fuel delivered and including a shaft rotatable in accordance with the rate of fuel delivery, a container in the housing for holding a supply of liquid additive to be added to the fuel, a transparent cylinder mounted on the top of said housing, a piston movable within the cylinder, a first line connecting said cylinder at a first end with said container to receive additive therefrom a check valve in said line permitteing additive flow only in the direction toward said cylinder, a second line leading from said end of the cylinder to the inlet end of said hose, a check valve in said second line permitting additive flow only away from the cylinder and toward the hose, a spring within the cylinder yieldingly urging said piston away from said first end of the cylinder to draw a charge of additive into the cylinder, a three way valve in the housing communicable with a source of compressed air and with a second end of the cylinder, said valve being operable in a first condition to admit air into said end of the cylinder to actuate the piston in a direction injecting additive from the cylinder and into the fuel at said hose, said valve being operable in a second condition to place said second end of the cylinder in communication with the atmosphere to permit return of the piston under the influence of said spring to thereby recharge the cylinder with additive, and a cam carried by said shaft of the computer and operable to intermittently actuate said valve between said second and first conditions at intervals varying in accordance with the rate of fuel delivery to inject metered charges of additive into the fuel at said intervals.

4. For use in combination with a liquid fuel dispensing pump unit comprising a housing, a delivery hose having a discharge end at the outside of said housing, a pump at the inside of the housing operable to pump fuel through said hose for delivery from said discharge end thereof, a meter in the housing responsive to the rate of fuel discharge through the hose, and a computer mechanism operable by said meter to indicate the amount of fuel delivered and having a shaft rotatable in accordance with the rate of fuel delivery; a container for holding a supply of additive to be added to the fuel, a piston and cylinder pump operable to inject additive from said container into the fuel discharged through said hose and having a transparent wall through which a customer may view the displacement of additive therein, said piston and cylinder pump being adapted for reciprocation by the admission of intermittent charges of compressed air thereto, a three way valve connectible to a supply of compressed air and operable to control the admission of air to and its release from the cylinder, and a cam to be mounted to said shaft of the computer for rotation therewith and operable to actuate said valve to intermittently admit charges of air to the cylinder and release said charges in accordance with the operation of the computer, whereby said piston operates to intermittently inject metered charges of additive into the fuel.

NEWCOMB D. TAYLOR.

References Cited in the file of this patent

UNITED STATES PATENTS

| Number | Name | Date |
|---|---|---|
| 1,720,326 | Halstead et al. | July 9, 1929 |
| 1,733,423 | Midgley | Oct. 29, 1929 |
| 1,745,141 | Baker | Jan. 28, 1930 |
| 1,763,335 | Watts | June 10, 1930 |
| 1,964,028 | Boynton et al. | June 26, 1934 |
| 1,985,918 | De Lancey | Jan. 1, 1935 |
| 2,365,192 | Hazard et al. | Dec. 19, 1944 |
| 2,538,111 | Luster | Jan. 16, 1951 |